Patented Apr. 28, 1931

1,802,474

UNITED STATES PATENT OFFICE

PAUL FRANÇOIS JOSEPH LEBRUN, OF PARIS, FRANCE, AND ROLLAND PRÉFONTAINE, OF MONTREAL, QUEBEC, CANADA

LUMINESCENT-TUBE MANUFACTURE

No Drawing.   Application filed March 13, 1929.   Serial No. 346,800.

This invention relates to improvements in electrodes for luminescent tubes and method of manufacturing same.

The objects of the invention are to prolong the life of the electrode, to enable an electrode with smaller superficial area to be used, and generally to improve the efficiency of the electrode.

In the manufacture of luminescent tubes such as those filled with neon, either alone or mixed with other rare gases, such as helium or argon, the light of the tube and its efficiency is to a considerable extent dependent upon the character of the electrodes. Various methods have been proposed for removing occluded gases from the electrode, or for treating them with gases designed to form a protective coating thereon, which will ensure a long useful life. In some instances, comparatively large electrodes have been employed with a view of reducing the absorption of the neon by the electrode.

We have found that if metallic electrodes composed for example of Swedish iron, ferrosilicon, or ferro-chromium, chromium aluminum iron, are treated with a chemical compound, the important constituents of which are hydrogen and nitrogen, such for example as ammonia gas, the surface of the electrode becomes extremely hard, and will have a durable and a long useful life in a luminescent tube.

In carrying out the process, the electrodes are heated in a suitable furnace in an atmosphere of ammonia gas, the temperature being conveniently from 500 to 800° C. with a pressure slightly above atmospheric. The length of treatment will depend under the nature and physical form of the electrode being treated and may vary from one half a minute to several hours.

While it will be generally found convenient to treat the electrodes prior to insertion in the tube they may be treated in the tube itself. When they are to be treated in the tube the procedure may be as follows:

The electrodes after being placed in the tube are heated to a temperature of from 500 to 800° C. The tube is exhausted with a vacuum pump with a relatively high degree of vacuum say of the order of .005 millimeters of mercury. The tube is then filled with ammonia gas at a pressure of from 3 to 4 millimeters of mercury and a high tension current of the order of 10,000 volts is passed between the electrodes, causing the electrodes to be heated to a temperature of 500 to 800° centigrade for a period determined by the character of the electrodes and their physical form, this period usually ranging from a few minutes to one hour. When this treatment is complete the current is cut off and the tube is pumped and then filled with its final filling in the usual way.

We have found that the use of the nitrogen and hydrogen in combination is much more effective than with the mere mixture of these gases, which is probably due to the fact that at the elevated temperature, the ammonia or other gases breaks up providing the hydrogen and nitrogen in a nascent state, in which it can more effectively combine with the metal of the electrode. At any event, it is found that the reaction is much more energetic and efficient when a compound of hydrogen and nitrogen is used, than when a mere mixture of these gases is used.

In addition to treating the electrodes themselves with the ammonia, or other hydrogen or nitrogen compound, we have found that such gas is effective as a scavenger or protecting gas for the interior of the tube, this treatment being given by filling the tube with ammonia or other gas, and passing a high tension current therethrough, and ammonia being introduced at a pressure of from .5 to 5 mm. of mercury, and a high tension current of the order of 10,000 volts being passed through for five or ten minutes. After the tubes are treated in this way, they are exhausted, and the final filling of luminescent gas such as neon or neon with argon and helium is introduced. The tube is cut off from the pump and is ready for use in the usual way.

This treatment of the tube with a compound of nitrogen and hydrogen is found to effectively remove impurities which are flushed out with the gas. In addition to this, the compound enters the pores of the tube which are evacuated by the escaping impurities and thereby prevents absorption, by the tube, of the neon or other permanent filling gases subsequently introduced therein.

Any suitable material capable of forming a compound with hydrogen and nitrogen may be used for the electrode, such as for example Swedish iron, ferro-silicon and ferro-chromium, chromium aluminum iron, and alloys of nitrogen and chromium.

It is possible that in some instances, the reaction with the hydrogen and nitrogen may be due to the small minute quantities of silicon in the metal of the electrodes.

As many changes could be made in the above process and many apparently widely different embodiments of our invention, within the scope of the claims, constructed without departing from the spirit or scope thereof, it is intended that all matter contained in the accompanying specification shall be interpreted as illustrative and not in a limiting sense.

What we claim as our invention is:

1. The herein described method of treating an electrode for use in a luminescent tube, which comprises heating the same in the presence of a compound of nitrogen and hydrogen.

2. The herein described method of treating an electrode for use in a luminescent tube, which comprises heating the same in the presence of ammonia.

3. The herein described method of treating an electrode for the purposes set forth, which consists in causing the metal of the electrode to form a compound with nitrogen and hydrogen.

4. The herein described method of treating a luminescent tube which consists in flushing the tube with ammonia while passing a high tension current therethrough.

In witness whereof we have hereunto set our hands.

PAUL FRANÇOIS JOSEPH LEBRUN.
ROLLAND PRÉFONTAINE.